(12) United States Patent
Park et al.

(10) Patent No.: US 7,428,633 B2
(45) Date of Patent: Sep. 23, 2008

(54) EMBEDDED DEVICE AND METHOD OF INITIALIZING THE SAME

(75) Inventors: Sung-sik Park, Suwon (KR); Hong-chan Park, Busan (KR); Han-sub Park, Anyang (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 574 days.

(21) Appl. No.: 10/347,347

(22) Filed: Jan. 21, 2003

(65) Prior Publication Data

US 2003/0149867 A1 Aug. 7, 2003

(30) Foreign Application Priority Data

| Feb. 5, 2002 | (KR) | 2002-0006575 |
| Jun. 11, 2002 | (KR) | 2002-0032685 |

(51) Int. Cl.
*G06F 15/177* (2006.01)
(52) U.S. Cl. .............................. 713/1; 714/5
(58) Field of Classification Search .................... 713/1, 713/2; 714/5–7
See application file for complete search history.

(56) References Cited

U.S. PATENT DOCUMENTS

| 5,748,940 A | 5/1998 | Angelo et al. |
| 5,751,950 A | 5/1998 | Crisan |
| 5,859,640 A | 1/1999 | de Judicibus |
| 6,182,225 B1* | 1/2001 | Hagiuda et al. ............... 726/19 |
| 6,230,181 B1 | 5/2001 | Mitchell et al. |

FOREIGN PATENT DOCUMENTS

| EP | 416732 | 3/1991 |
| JP | 2000-112576 | 4/2000 |

OTHER PUBLICATIONS

Ken Wright—"FAQ: Resetting Palm Handhelds"—Jan. 30, 2001—Newsgroups: comp.sys.palmtops.pilot.*
BruceMc—"Visor Deluxe or Palm IIIe?"—Nov. 28, 1999—Newsgroups: alt.comp.sys.palmtops.pilot.*
Japanese Office Action for corresponding Japanese Patent Application No. 2003-022531 dated Jan. 30, 2003.

* cited by examiner

*Primary Examiner*—Thuan N Du
(74) *Attorney, Agent, or Firm*—Staas & Halsey LLP

(57) ABSTRACT

An embedded device and an initialization method of the same in which a data loss warning and a reset mode selection menu is displayed, in response to a hard reset command to allow a user to confirm and/or select either cold booting or warm booting after being notified of data loss.

8 Claims, 4 Drawing Sheets

EMBEDDED DEVICE AND METHOD OF INITIALIZING THE SAME

CROSS-REFERENCE TO RELATED APPLICATIONS

This application claims the benefit of Korean Application Nos. 2002-6575 filed Feb. 5, 2002, and 2002-32685, filed Jun. 11, 2002, in the Korean Intellectual Property Office, the disclosures of which are incorporated herein by reference.

BACKGROUND OF THE INVENTION

1. Field of the Invention

The present invention relates to a device with an embedded storage space to backup data (i.e., an embedded device) and a method of controlling the same, and more particularly, to an embedded device having a reset function and a method of initializing the same.

2. Description of the Related Art

An embedded device, like a personal digital assistant (PDA), backs up data by using RAM (Random Access Memory). The PDA divides the storage space of the RAM into an operation area and a storage area. The operation area is for loading an OS (operating system), application programs and to temporarily record data input from a user. The storage area is for installing the application programs and backing up the data input from the user.

Moreover, the embedded device comprises a reset mode to re-operate the system in case the operation of the system is stopped. There are mainly two reset modes of a soft reset and a hard reset. The hard reset resets the system to an initial state by deleting all the data recorded in the RAM, while the soft reset starts the system by deleting only the data of the operation area in the RAM and preserving the data in the storage area. The hard reset and the soft reset are called 'cold booting' and 'warm booting,' respectively.

FIG. 1 is a flow chart of the soft reset and the hard reset of a conventional embedded device. At operation 110, an embedded device can enter an endless loop or application programs can conflict with other software or there might be an operating system kernel disorder, causing the system to be in a hang state. In the hang state, at operation 120, when the user selects either a hard reset or a soft reset, at operation 130, a reset operation in response to the selected reset command is performed. Accordingly, at operation 122, when a soft reset interrupt is generated as the soft reset command is input, at operation 132, a kernel interrupt handler of the OS performs the soft reset routine in response to the soft reset interrupt. That is, at operation 132, the warm booting is operated based on the soft reset routine. At operation 124, when the hard reset command is input by the user through an external input pin, at operation 134, the embedded device operates hardware initialization without using the kernel interrupt handler of the OS. In other words, at operation 134, the cold booting is operated based on the hard reset command input through the external input pin.

In the reset controlling method of the conventional embedded device, the user usually tries the soft reset first, and when there is no reply from the device, the user tries the hard reset. It is for the purpose of maintaining the data recorded in the RAM that the user first tries the soft reset. However, when there is no reply from the system, the user has no choice but to try the hard reset because typically it means that the kernel is in a panic, i.e., that there is disorder in the kernel. However, many users, especially those who are familiar with desktop computers, may be unaware that all the data recorded in the RAM are deleted when executing the hard reset in the embedded device.

Accordingly, when the user operates the hard reset on purpose, or by mistake, in the conventional embedded device, all the data recorded in the RAM is deleted. Especially, the user of the portable device, like the PDA, would be significantly inconvenienced because the hard reset initializes the system, deleting all configuration data set up by the user, application programs, and back-up data.

SUMMARY OF THE INVENTION

Accordingly, the present invention provides an embedded device preventing inadvertent data loss due to execution of a hard reset selected by a user and an initializing method thereof.

Additional advantages of the invention will be set forth in part in the description which follows and, in part, will be obvious from the description, or may be learned by practice of the invention.

The present invention is accomplished by an embedded device including a data storage unit having stored therein a configuration setting data and user data, said embedded device having a hard reset mode that when selected initializes said embedded device by deleting said user data from said data storage unit, said embedded device having a soft reset mode that when selected initializes said embedded device while preserving at least a portion of said user data in said data storage unit, said embedded device comprising a controller configured to receive a hard reset selection signal indicating said hard reset mode being selected, and to provide, in response to said hard reset selection signal, a confirmation message alerting a user of said embedded device of said hard reset mode being selected.

According to an aspect of the present invention, the embedded device comprises a display, and said confirmation message is a visual user interface screen displayed on said display.

According to an aspect of the present invention, the visual user interface screen comprises a menu screen including at least a first selectable option and a second selectable option, said controller activating said hard reset mode upon user selection of said first selectable option, and said controller disregarding said hard reset selection signal upon user selection of said second selectable option.

According to an aspect of the present invention, the controller provides a selection menu having said hard reset mode and said soft reset mode through said visual user interface screen in response to a reset signal received without indication of selection of said hard reset mode or said soft reset mode, said controller performing the user selected reset mode.

The present invention can also be achieved by a method of initializing an embedded device that includes a data storage unit having stored therein a configuration setting data and user data, said embedded device having a hard reset mode that when selected initializes said embedded device by deleting said user data from said data storage unit, said embedded device having a soft reset mode that when selected initializes said embedded device while preserving at least a portion of said user data in said data storage unit, the method comprising receiving a hard reset selection signal indicating selection of the hard reset mode by a user of said embedded device; providing a hard reset selection signal indicating said hard reset mode being selected by the user of said embedded device; and providing, in response to said hard reset selection signal, a confirmation message alerting said user of said hard reset mode being selected.

According to an aspect of the present invention, the initialization method further comprises displaying the confirmation as a visual user interface screen.

According to an aspect of the present invention, the displaying of the user interface comprises displaying a menu screen including at least a first selectable option to activate said hard reset mode and a second selectable option to prevent/cancel said hard reset mode from being activated.

According to an aspect of the present invention, providing the confirmation message comprises providing a selection menu having said hard reset mode and said soft reset mode through a visual user interface screen in response to a reset signal received without indication of selection of said hard reset mode or said soft reset mode, and performing one of the reset modes selected by the user from the selection menu.

BRIEF DESCRIPTION OF THE DRAWINGS

The above-mentioned objects and the feature of the present invention will be more apparent by describing the preferred embodiment of the present invention by referring to the appended drawings, in which.

DETAILED DESCRIPTION OF THE PREFERRED EMBODIMENTS

Figure 1:
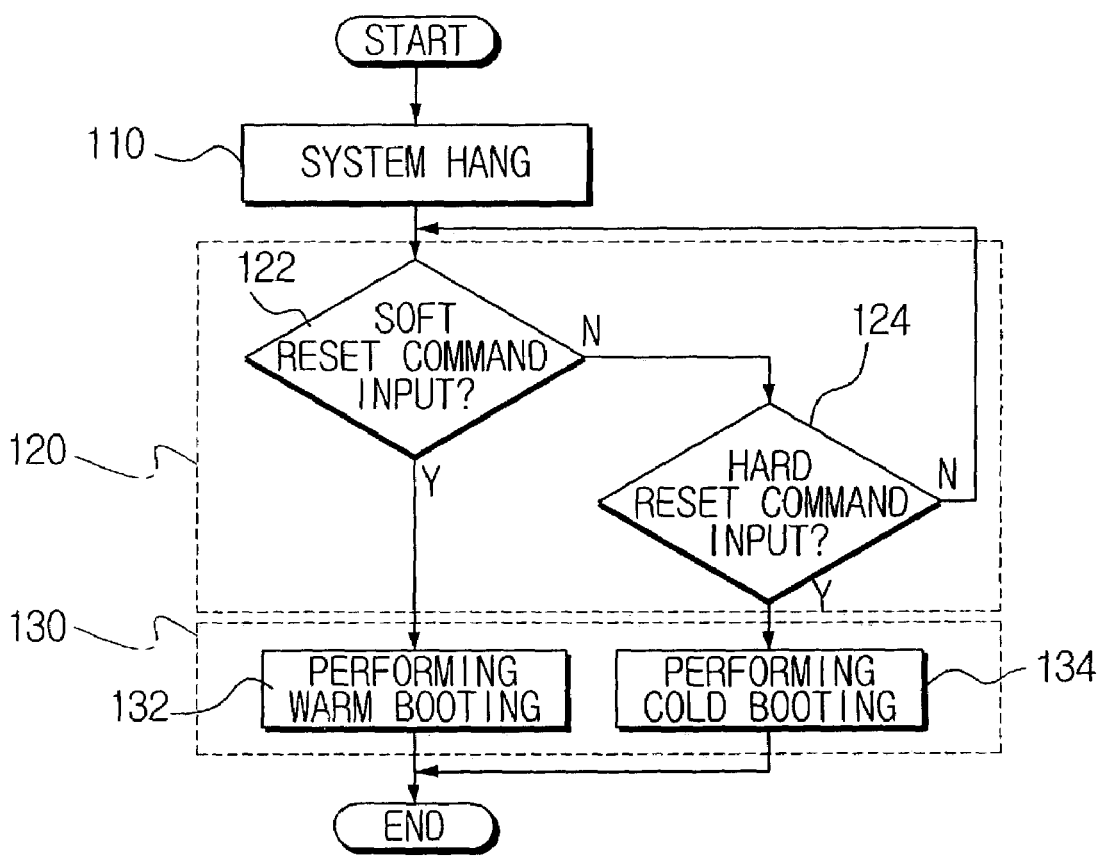
FIG. 1 is a flow chart of a reset controlling method of a conventional embedded device.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
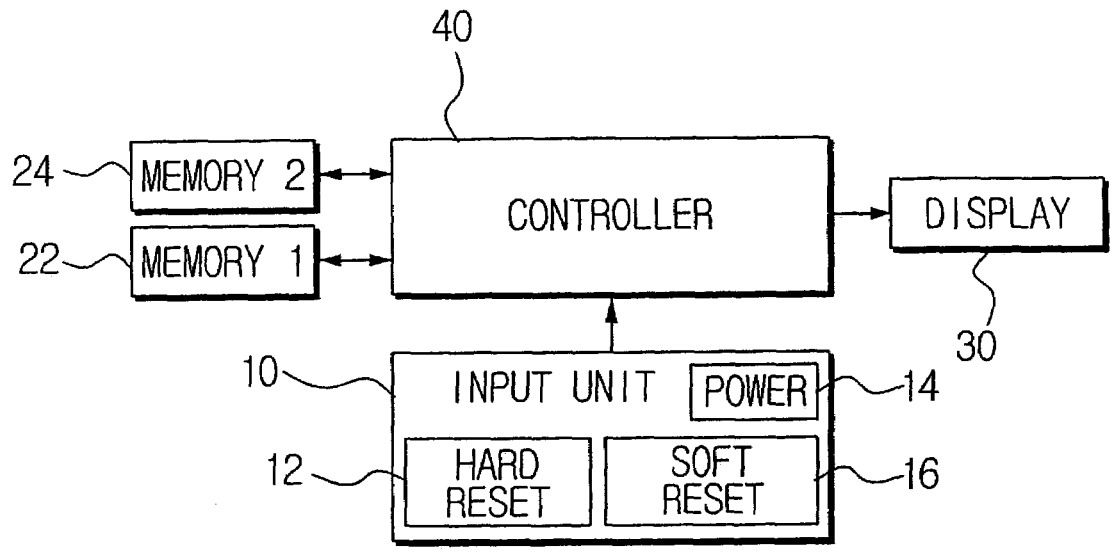
FIG. 2 is a block diagram of an embedded device according to an embodiment of the present invention.

FIG. 2 is a block diagram of a PDA (Personal Digital Assistant) according to an embodiment of the present invention. The PDA has an input unit 10, first and second memories 22 and 24, a display 30 and a controller 40.

The input unit 10 comprises command input keys 12 and 14 to allow a user to input either a hard reset command or a soft reset command, various command input keys, such as a power input key 16, and various other input means (not shown) to input data of the user. For example, the input means can be a keyboard, an input pen, a touch screen, a microphone, or other known input techniques. Here, the input unit 10 can be a single command input key (not shown) or a displaying reset command menu input key (not shown) displaying a reset command menu when a command is input via the input key, instead of the command input keys 12 and 14. In case of the single command input key, there can be a separate soft reset key to operate the soft reset directly without displaying the reset command menu at the display 30 through the single command input key.

The first memory 22 stores an operating system (OS) comprising a kernel related to operation of the system (i.e., the embedded device). Some devices use the storage space of the first memory 22 as an OS installation area and an application program installation area.

The second memory 24 stores environment set-up data, application programs and working data of the user. Here, the second memory 24 has an operation area to temporarily store program data related to the operation of the system loaded via the OS and to temporarily store the working data of the user, and a storage area to back up the working data by the user.

Figure 3:
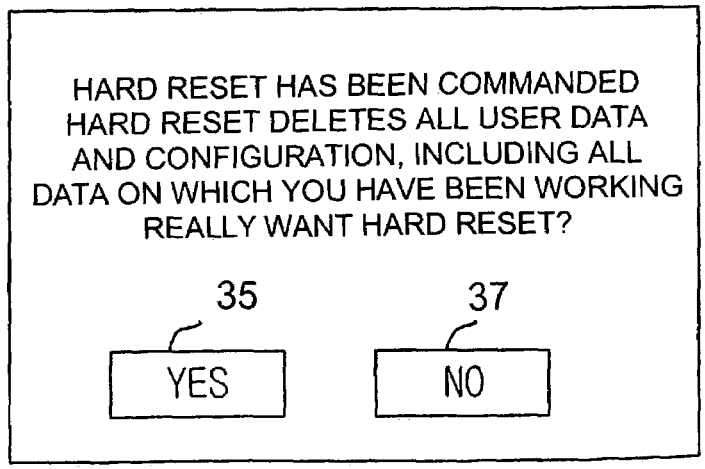
FIGS. 3 through 5 are example display screens in response to a hard reset command input in the embedded device of FIG. 2, according to an embodiment of the present invention.
Figure 4:
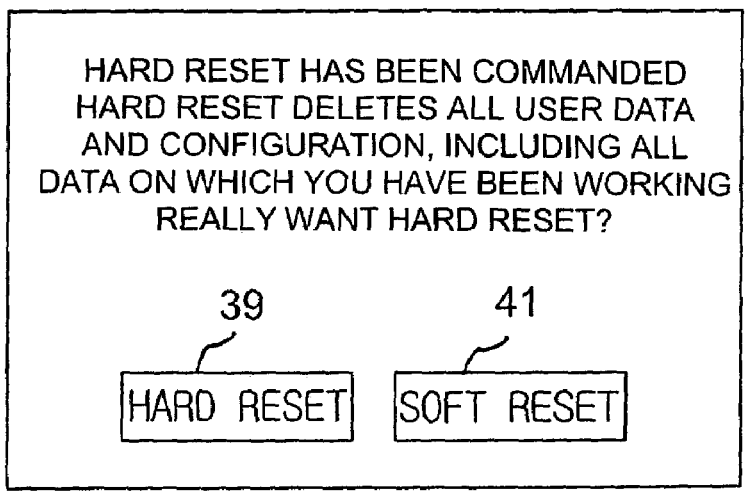
Figure 5:
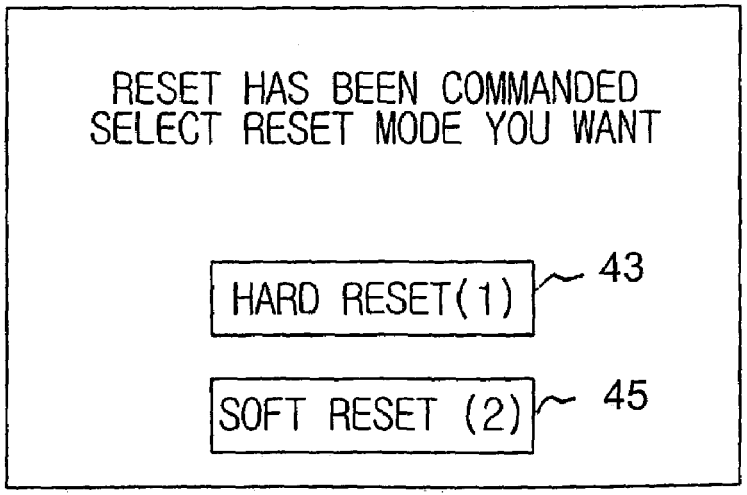

The display 30 displays a visual user interface screen under the control of the controller 40. The controller 40 controls the embedded device to display a confirmation message alerting a user about selection of a hard reset in response to a hard reset command input through the input unit 10. The confirmation message can be a selection menu displayed on the screen of the display 30 as shown in FIG. 3. Alternatively, the controller 40 can display a warning massage and a conformation message at the display 30 as shown in FIG. 4, in response to the hard reset command input through the input unit 10 by the user. In particular, in FIG. 4, a confirmation menu is displayed providing the hard reset mode menu selection as the confirmation of the hard reset command and a soft reset mode menu selection as the cancellation of the hard reset command. Alternatively, as shown in FIG. 5, the controller 40 can display a reset selection menu of a hard reset and a soft reset in response to an input of a reset mode. In particular, in FIG. 5, an input reset mode would be a generic reset selection by the user, not indicating the type of reset requested, such as the hard reset or the soft reset. The controller 40 operates according to the selection made by the user among the reset selection menus displayed at the display 30.

FIG. 3 is a an example display screen in response to an input hard reset command to the embedded device shown in FIG. 2. When a hard reset command is input through the input unit 10, the controller 40 displays on the screen of the display 30 a warning message alerting the user data loss and a confirmation message selection menu, prompting the user to confirm the hard reset selection. When the selection of the hard reset command from the user is confirmed in the confirmation message displayed, in other words, in FIG. 3, when a 'yes' button 35 is selected, the controller 40 operates a cold booting. When a 'no' button 37 is selected, the controller 40 returns the screen to a status before input of the hard reset command.

FIG. 4 is a another example display screen in response to an input hard reset command to the embedded device of FIG. 2. When the hard reset command is input through the input unit 10, the controller 40 displays a warning message and a confirmation selection menu, prompting the user to select again a hard reset or a soft reset. In particular, the confirmation selection menu comprises a displayed 'hard reset' button 39 instead of the 'yes' button 35 of FIG. 3 and a 'soft reset' button 41 instead of the 'no' button 37 of FIG. 3. A selected reset operation corresponding to a displayed button selected by the user is operated.

FIG. 5 is another example display screen in response to an input reset command to the embedded device of FIG. 2. When a generic reset command is input through a reset mode displaying command input key formed in the input unit 10, which has no indication of a hard reset or a soft reset, the controller 40 displays a selection menu of the hard reset and the soft reset at the display 30 as shown in FIG. 5. The controller 40 performs a reset operation corresponding to a reset command selected by the user from the displayed selection menus. In particular, in FIG. 5, after the user selects the hard reset button 43, one of the display screens shown in FIGS. 3 and 4 is displayed, providing the user an opportunity to confirm selection of the hard reset, cancel the hard reset selection or select a soft reset.

Figure 6:
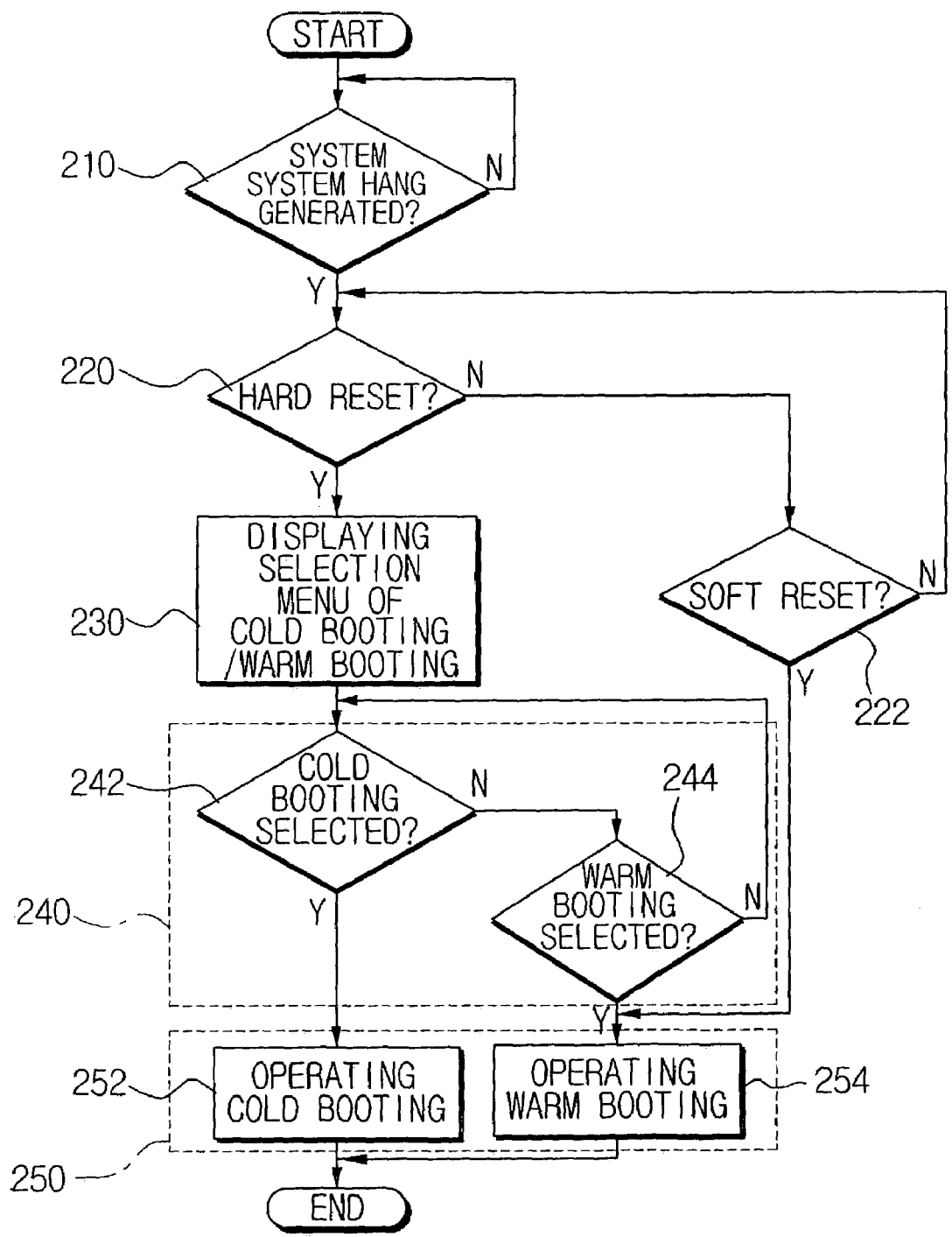
FIG. 6 is a flow chart of a reset controlling method of the embedded device of FIG. 2.

FIG. 6 is a flow chart of a reset controlling method of the embedded device shown in FIG. 2. If the embedded device can enter an endless loop or an application program can conflict with another program or there might be an OS kernel disorder, at operation 210 the system enters into a hang state. In the hang state, at operation 220, when a hard reset command is input via the input unit 10, at operation 230, a reset mode selection menu is displayed to allow a user to select one from a cold booting (hard reset mode) and a warm booting (soft reset mode). At operation 240, one of the modes displayed on the mode selection menu is selected by the user, at operation 250, a booting operation corresponding to the selected mode is operated. In other words, at operation 242, when a cold booting is selected, at operation 252, a cold booting is operated, and at operation 244, when a warm booting is selected, at operation 254, the warm booting is operated.

At operation 222, when input of a soft reset command through a soft reset key is detected, at operation 252, the embedded device immediately performs a warm booting without displaying a reset mode selection menu at the display 30.

According to the present invention's method of controlling reset of an embedded device, because data loss in response to a hard reset is alerted to a user, a user can confirm selection of the hard reset so that when the user again selects and/or selects the hard reset to be performed, the user can be prepared/is notified regarding possible data loss, and thus, the user is enabled to preserve the data more safely (i.e., preclude inadvertent data loss). Further, with an embedded device and an initializing method of the same according to the present invention, data loss following selection of a hard reset is alerted to a user if the user selects the hard reset by mistake, thereby preventing inadvertent data loss by the user and/or allowing someone who is not familiar with the device can keep the stored data safely. Further, even when a user selects a hard reset because of a hang-state of the system during operation of the system, a warm booting can still be performed by another selection of the user (i.e., the user has another opportunity to select a warm booting). Accordingly, the present invention prevents inadvertent data loss by providing to a user a data loss warning and displaying a reset mode selection menu, in response to a hard reset command to allow a user to confirm and/or select either cold booting or warm booting after being notified of data loss. The processes of the present invention embodied in the controller 40 and the input unit 10 are implemented in computer hardware and/or software.

Although the embodiments of the present invention has been shown and described, it would be appreciated by those skilled in the art that changes may be made to the embodiments without departing from the principles and spirit of the invention, the scope of which is defined in the claims and their equivalents.

What is claimed is:

1. An embedded, unpassword-protected device including a data storage unit having stored therein a configuration setting data and user data, said embedded, unpassword-protected device having a hard reset mode that when selected initializes said embedded, unpassword-protected device by deleting said user data from said data storage unit, said embedded, unpassword-protected device having a soft reset mode that when selected initializes said embedded, unpassword-protected device while preserving at least a portion of said user data in said data storage unit, said embedded, unpassword-protected device comprising:
    a first memory of the data storage unit to provide a storage area as an operating system installation area, and, where selected, an application program installation area;
    a second memory of the data storage unit to store environment set-up data, application programs, working data of a user, and to provide an operation area to temporarily store program data related to operation of the operating system; and
    an unpassword-protected controller receiving a hard reset selection signal, and providing, in response to said hard reset selection signal, a confirmation message alerting a user of said embedded device of selection of said hard reset mode and a warning message that the hard reset selection signal deletes all user data and configuration including all data on which the user has been working,
    wherein said unpassword-protected controller provides a selection menu having a hard reset mode and a soft reset mode through said visual user interface screen in response to a reset signal received without indication of selection of said hard reset mode or said soft reset mode, said unpassword-protected controller performing the user selected reset mode, and
    wherein the hard reset mode and the soft reset mode are displayed together in the selection menu.

2. The embedded, unpassword-protected device according to claim 1, further comprising:
    a display,
    wherein said confirmation message is a visual user interface screen displayed on said display.

3. The embedded, unpassword-protected device according to claim 2, wherein:
    said visual user interface screen comprises a menu screen including at least a first selectable option and a second selectable option, said unpassword-protected controller activating said hard reset mode upon user selection of said first selectable option, and said unpassword-protected controller disregarding said hard reset selection signal upon user selection of said second selectable option.

4. A method of initializing an embedded, unpassword-protected device that includes a data storage unit having stored therein a configuration setting data and a user data, said embedded, unpassword-protected device having a hard reset mode that when selected initializes said embedded, unpassword-protected device by deleting said user data from said data storage unit, said embedded, unpassword-protected device having a soft reset mode that when selected initializes said embedded, unpassword-protected device while preserving at least a portion of said user data in said data storage unit, said method comprising:
    utilizing a first memory of the data storage unit to provide a storage area as an operating system installation area, and, where selected, an application program installation area;
    utilizing a second memory of the data storage unit to store environment set-up data, application programs, working data of a user, and to provide an operation area to temporarily store program data related to operation of the operating system;
    receiving a hard reset selection signal indicating selection of the hard reset mode by a user of said embedded, unpassword-protected device; and
    providing, in response to said hard reset selection signal, a confirmation message alerting said user of selection of said hard reset mode and a warning message that the hard reset selection signal deletes all user data and configuration including all data on which the user has been working, wherein, in response to a reset signal received without indication of selection of said hard reset mode or said soft reset mode, the providing of the confirmation message comprises providing a selection menu having said hard reset mode and said soft reset mode through a visual user interface screen, and performing one of the reset modes selected by the user, and wherein the hard reset mode and the soft reset mode are displayed together in the selection menu.

5. The method in accordance with claim 4, wherein the provision of the confirmation message comprises displaying a visual user interface screen.

6. The method in accordance with claim 5, wherein the displaying of the visual user interface comprises providing a menu screen including at least a first selectable option to activate said hard reset mode and a second selectable option to cancel said hard reset mode from being activated.

7. An unpassword-protected device with an embedded storage space to backup user data, comprising:
  a first memory of the embedded storage space to provide a storage area as an operating system installation area, and, where selected, an application program installation area;
  a second memory of the embedded storage space to store environment set-up data, application programs, working data of a user, and to provide an operation area to temporarily store program data related to operation of the operating system; and
  an unpassword-protected programmed computer processor notifying a user of data loss and displaying a reset mode selection menu, in response to a hard reset command, to allow the user to confirm and/or select either the hard reset or a soft reset preserving the data, after the data loss notification and providing a warning message that activation of the hard reset command deletes all user data and configuration including all data on which the user has been working, wherein the unpassword-protected computer processor provides a selection menu having a hard reset mode and a soft reset mode through a visual user interface screen on a display in response to a reset signal received without indication of selection of said hard reset mode or said soft reset mode, said unpassword-protected computer processor performing the user selected reset mode, and wherein the hard reset mode and the soft reset mode are displayed together in the selection menu.

8. A method of hard resetting an unpassword-protected device having an embedded storage space to backup user data, comprising:
  providing, on a display, an option of a soft reset command wherein soft resetting preserves at least a portion of data of a user in a second memory of a data storage unit;
  warning, on a visual user interface screen displayed on the display, the user of deletion of all user data if hard resetting is selected, wherein a warning message indicates that hard resetting deletes all user data and configuration including all data on which the user has been working;
  providing, on the display, an option of a cancellation command to cancel resetting; and
  hard resetting the unpassword-protected device and deleting the user data in a first memory of the data storage unit in response to nonselection of the soft reset command, nonselection of the cancellation command, and selection of a hard reset command by the user, wherein said unpassword-protected device provides a selection menu having a hard reset mode and a soft reset mode through said visual user interface screen in response to a reset signal received without indication of selection of said hard reset mode or said soft reset mode, said unpassword-protected device performing the user selected reset mode, and wherein the hard reset mode and the soft reset mode are displayed together in the selection menu.

* * * * *